United States Patent Office 3,196,119
Patented July 20, 1965

3,196,119
MODIFIED ALKYD RESIN COMPOSITIONS AND PROCESS OF PREPARING THE SAME
Robert A. Boller and Richard B. Graver, Minneapolis, Minn., assignors to Archer-Daniels-Midland Company, Minneapolis, Minn., a corporation of Delaware
No Drawing. Continuation of application Ser. No. 743,027, June 19, 1958. This application June 24, 1964, Ser. No. 377,521
21 Claims. (Cl. 260—22)

This application is a continuation of our copending application Serial No. 743,027, filed June 19, 1958, and now abandoned.

This invention relates to solvent soluble compositions of modified alkyds and epoxidized fatty chain derived compounds having internal oxirane oxygen, products derived therewith and therefrom and method of producing the same. More particularly, the invention relates to improved alkyd resin coating compositions, the alkyd resin material in combination with or modified by an epoxidized long chain fatty oil derived material, the method of producing the same in an organic solvent system and products derived therefrom.

Current industrial and automotive paints and baking enamels are acceptable when they have such properties as: excellent color and color retention, good gloss, rapid cure, early hardness, low viscosity at high solids, a wide compatibility and good stability with other resinous materials, and easy pigmentation. Some few known resins, which meet these requirements are various solvent alkyd resin systems modified with either urea or melamine resins. However, flexibility is sacrificed to hardness level with other problems in color retention and solvent and alkali resistance.

Accordingly, it is an object of this invention to provide organic solvent thinned alkyd resin and epoxidized fatty oil derived materials having internal oxirane oxygen, as new and useful adhesive, plastic and vehicle compositions which have wide compatibility with other solvent soluble materials, and form intermolecular complexes with high chemical resistance and from pliable to varying degrees of hardness.

It is another object of this invention to provide pigmented coating vehicles of modified alkyd resins and epoxidized oil compositions in organic solvent systems which produce tough, durable, flexible films at high hardness levels, excellent resistance to water, alkali and acid materials, excellent toughness and resistance to weathering and abrasion, excellent cold check resistance, and having excellent resistance to yellowing, excellent color retention when pigmented, and excellent adhesion to glass, metal and other resinous surfaces.

Another object of this invention is to provide solvent soluble compositions of modified alkyd resin materials and epoxy compounds having internal oxirane oxygen, forming vehicles which have good stability with pigments, cure rapidly with an early hot hardness, low viscosity at high solids, and form films of excellent color and gloss characteristics.

It is another object of this invention to provide organic solvent soluble varnish, paint and enamel vehicles comprising mixtures of reactive film forming resinous materials and reactive long chain epoxy compounds derived from a fatty oil source, which vehicles are capable of being cured by baking to give finishes with high gloss, excellent water, alkali and chemical resistance including good adhesion, flexibility, toughness and color retention.

An additional object of this invention is to provide varnish, paint and enamel vehicles containing epoxidized compounds of 8 to 26 carbon atoms in the fatty chain portion containing non-terminal oxirane oxygen and an alkyd ester material, with or without further modification by other resinous and film forming compositions.

It is a further object of this invention to provide plastic bonding and coating compositions of alkyd esters modified by an epoxidized stearyl compound, with or without additional modifying components, and the process of preparing and utilizing the same.

To the accomplishment of the foregoing and related ends, this invention then comprises the features hereinafter more fully described and inherent therein, and as particularly pointed out in the claims, the following description setting forth in detail certain illustrative embodiments of the invention and improvement, these being indicative, however, of but a few of the various ways in which the principle of the invention or improvement may be employed. For producing the epoxidized oil modified alkyds and compositions as herein described, the processing involves two procedural parts as follows:

Part 1: In this part of the processing there is formed a modified alkyd ester (resin) which is the reaction product of a mono-basic acid, a poly-basic acid, or anhydride, and a polyol. A second poly-basic anhydride is reacted with the previously prepared mono-basic acid poly-basic acid polyol ester so as to produce modified alkyd resin half ester material. These complexes are all of high acid number (AN) of about 80 to 120, after the final reaction, in which the carboxyl group or groups are reactive with epoxy compounds.

This alkyd resin is a special resin made by reacting a fatty acid or other mono-basic acid material, a polyol material and a suitable dibasic acid or anhydride such as phthalic anhydride at 360–400° F. to a specified acid number (45–90) and with the addition of a sufficient quantity of a second suitable dibasic anhydride, such as phthalic anhydride, monochloro-phthalic anhydride, tetrachloro-phthalic anhydride, chlorendic anhydride etc., and cooking only long enough at 360–380° F. to form the half ester of the second anhydride. This resin is then cooled and may or may not be thinned, with a suitable solvent e.g. xylene or xylene-butanol (95 parts xylene, 5 parts butanol), or equivalent.

Part 2: In this part of the processing the modified alkyd half-ester-complex of Part 1 is cooled down to about 300° F. or less and thinned, preferably with an aromatic type solvent, as indicated and with or without a second solvent, which may aid in solution clarity and viscosity control. After cooling down to about 110° F. or less, an epoxidized compound having internal oxirane oxygen is added with or without the prior, subsequent or simultaneous addition of a neutralizing inhibitor and stabilizer.

Alternately, the neutralizing inhibitor and stabilizer, such as a suitable amine, preferably a tertiary amine, or other suitable temporary inhibitor, may be added to the alkyd ester of Part 1, before or with the addition of up to about 25% epoxidized fatty base component. In the event that over about 25% to 30%, in parts by weight, epoxy base component is added, a partial reaction between the formed alkyd resin half ester and the epoxy component is required for optimum film properties. Further, in this part of the formulation of the vehicle, if the partial reaction is necessary, care is taken to guard against allowing the reaction between the alkyd resin half ester complex of Part 1 and the epoxidized compound to go to completion. To this end, the addition of about 25% epoxidized oil base material with the compositions of Part 1 will bake out to tough, high gloss films with curing temperatures of about 250° F. to 300° F. in a period of about 30 minutes. Otherwise, when over about 25% to 30% epoxidized oil base component is added to the alkyd resin half ester complex of Part 1, a partial reaction is preferably effected forming a solvent soluble intermolecular complex having residual acidity which is neutralized before completion of the reaction. Softer films may be obtained by addition of more than 30% epoxidized oil without a partial reaction.

Films formed from the compositions can be cured at temperatures varying from 150–300° F. in 10–60 minutes or more. At lower temperatures, longer curing times are required. A preferred baking schedule is about 30 minutes at 250° F. to 300° F. for obtaining the preferred baked films, as herein contemplated.

As heretofore indicated, the neutralizing-stabilizer is added in an amount at least chemically equivalent to the acidity of the composition of Part 1. This neutralization stabilizes the product during storage. Subsequently, upon application as a dip or spray film, for example, the neutralizer-stabilizer evaporates or is driven off permitting inter-reaction between the alkyd resin half ester and the epoxy compound, with resultant formation of the desired film as an alkyd-epoxy resin complex.

As hereinafter illustrated, the base resin forming constituent is a dibasic acid modified alkyd. For non-yellowing characteristics, the alkyd is preferably prepared with saturated fatty acids. However, the alkyd may be further modified with benzoic acid material and the like. For production of hard, tough high gloss films, the epoxidized component preferably contains 8% or higher internal oxirane oxygen.

The following are non-limiting examples illustrating compositions and products, including their method of preparation, affording film forming compositions derived from modified alkyd esters and epoxidized long chain fatty materials:

*Example I*

Part 1:         Parts by weight
 (A) Hydrogenated coconut fatty acids _____ 440
 (B) Pentaerythritol _____ 412
 (C) Phthalic anhydride _____ 552
 (D) Maleic anhydride _____ 4
 (E) Xylene _____ 80

The above components were mixed and reacted in a conventional alkyd esterification process, under a reflux temperature of 360–380° F. until the AN (acid number) had fallen to 80, as determined by any standard testing method. The reaction mixture was then cooled to 275° F., or lower, and 376 parts tetrachlorophthalic anhydride was added and the reaction mixture held above 350° F. for at least 30 minutes. The solution was cooled to 300° F. and thinned to 50% solids with xylene.

The solution analyzed: Gardner color 2+; vis. 66 stokes; AN 106.9 (solids basis).

Part 2:            Parts
 (A) Base modified alkyd of Part 1 (50% in
   xylene) _____ 2573
 (B) Triethylamine _____ 251
 (C) Butanol _____ 105
 (D) Epoxidized linseed oil (8.3% oxirane)__ 261

The solution of the base modified alkyd of Part 1, was cooled to 80° F., to which the triethylamine and butanol was added and mixed until homogeneous. During mixing the temperature rose to 110–120° F. The solution was then cooled to below 110° F. and the epoxidized linseed oil was added with agitation until a homogeneous solution was obtained.

The product analyzed: Gardner color 2; vis. 10 stokes; percent non-volatile (NV) 49.1. Films of the solution formed hard, flexible, water and chemical resistant coatings after being baked at 250° F. for 30 minutes.

The base modified alkyd of Part 1 is also compatible with other epoxy fatty oil base materials as illustrated by the following:

Part 2a: To 493 parts of the base modified alkyd of Part 1 was added 48 parts triethylamine, 50 parts epoxidized soybean oil (6.2% oxirane value) and 20 parts butanol, blended by conventional paddle mixing until a homogeneous solution was formed. The combined alkyd-epoxy solution analyzed: Gardner color 2; vis. 10.7 stokes and percent NV 49.1. On baking at 250° F. for 30 minutes a tough flexible, water and chemical resistant film was obtained with a softer characteristic than was obtained with the linseed oil epoxidized to an 8% oxirane value.

*Example II*

Part 1:         Parts by weight
 (A) Pelargonic acid _____ 400
 (B) Pentaerythritol _____ 412
 (C) Phthalic anhydride _____ 517
 (D) Maleic anhydride _____ 4
 (E) Xylene _____ 80
 (F) Tetrachlorophthalic anhydride _____ 376

The above components were mixed and reacted in a manner as described for Part 1 of Example I, cooled and thinned to a 50% solids solution with xylene. This base alkyd ester analyzed: Gardner color 1+; vis. 10.5 stokes (50% NV); AN 97.4 (on solids).

Part 2:            Parts
 (A) Base ester resin of Part 1 (50% xylene
   solution) _____ 2,607
 (B) Triethylamine _____ 229
 (C) Butanol _____ 53
 (D) Xylene _____ 42
 (E) Epoxidized linseed oil (8.0% oxirane)__ 262

The components were combined in the manner as described in Example I. The alkyd ester-epoxy composition analyzed: Gardner color 1.5; vis. 8 stokes; and NV 49.4%.

*Example III*

Part 1:            Parts
 (A) Soya fatty acids _____ 500
 (B) Pentaerythritol _____ 412
 (C) Phthalic anhydride _____ 570
 (D) Maleic anhydride _____ 4
 (E) Xylene _____ 80
 (F) Tetrachlorophthalic anhydride _____ 376

This alkyd ester was prepared and modified in the manner as described in Example I.

The solution analyzed: Gardner color 4; vis. 350 stokes, AN 93.5 (on solids), NV 50%.

Part 2:            Parts
 (A) Base ester resin of Part 1 (50% solution
   NV in xylene) _____ 2,688
 (B) Triethylamine _____ 229
 (C) Butanol _____ 175
 (D) Epoxidized linseed oil (8.3% oxirane) _ 276

The components were combined as described above. The product analyzed: Gardner color 3; vis. 8.5 stokes; NV 49.0%.

*Example IV*

A vehicle composition was prepared in the manner of Example III, substituting tall oil fatty acids for the soya fatty acids. The base modified alkyd and modified alkyd epoxy solutions analyzed substantially in the range as indicated in the foregoing Example III. The films baked at 250° F. for 30 minutes were hard, tough, water and chemical resistant.

*Example V*

Part 1:            Parts
 (A) Hydrogenated coconut fatty acid _____ 382
 (B) Trimethylol ethane _____ 208
 (C) Pentaerythritol _____ 236
 (D) Phthalic anhydride _____ 572
 (E) Xylene _____ 80
 (F) Maleic anhydride _____ 4

The components of this composition were reacted in the manner as described in Example I until the acid number of the alkyd ester reached 64–68. The reactant composition was then cooled to 275° F. and 376 parts tetrachloro-phthalic anhydride added in the final cooking in the manner as described in Example I. The base modified alkyd ester analyzed: NV 50.4%, Gardner color; vis. 23.5 stokes and AN 87.6 (on solids).

Part 2: To 2,777 parts of a 50% solution of this modified alkyd ester, in the solvent xylene, as added 216 parts triethylamine, 275 parts epoxidized linseed oil (8.3% oxirane oxygen) and 91 parts butanol, in the manner as described in Example I. This modified alkyd ester-epoxy composition analyzed: Gardner color 2; vis. 5.2 stokes; and NV 49.1%.

Upon baking at 250° F. for 30 minutes a hard flexible film was obtained comparable to the film of Example I, Part 2.

Part 2a: To 505 parts of the alkyd base of Example V was added 39 parts triethylamine, 50 parts epoxidized safflower oil (7.1% oxirane value) and 17 parts butanol with conventional blending until homogeneous.

The blended composition formed a tough, flexible, water and chemical resistant film upon being baked at 250° F. for 30 minutes. The film hardness was somewhat less than obtained with the epoxidized linseed oil, but sufficient for coating purposes. Further, other epoxidized oils and esters of somewhat lower oxirane value, as soybean oil (6.3% oxirane), epoxy-stearyl acetate and the like, replacing the above safflower oil yielded softer and flexible films.

*Example VI*

Part 1:

| | Parts |
|---|---|
| (A) Pelargonic acid | 300 |
| (B) Trimethylol ethane | 211 |
| (C) Pentaerythritol | 233 |
| (D) Phthalic anhydride | 556 |
| (E) Maleic anhydride | 4 |
| (F) Xylene | 80 |
| (G) Tetrachlorophthalic anhydride | 372 |

The alkyd ester and modified alkyd ester were prepared in a manner as described in Example V.

The modified alkyd ester composition analyzed: Gardner color 2—; vis. 17.8 stokes; AN 93.9 (on solids); NV 50.3%.

Part 2: To 2,517 parts of a 50% solution of this modified alkyd ester in xylene was added 212 parts triethylamine, 250 parts epoxidized linseed oil (8.3% oxirane oxygen) and 70 parts butanol, in the manner as described in Example I, and analyzed: Gardner vis. U+; Gardner color 2—; NV 49%.

*Example VII*

Part 1:

| | Parts |
|---|---|
| (A) Pelargonic acid | 300 |
| (B) Trimethylol propane | 233 |
| (C) Pentaerythritol | 233 |
| (D) Phthalic anhydride | 556 |
| (E) Maleic anhydride | 4 |
| (F) Xylene | 80 |
| (G) Tetrachlorophthalic anhydride | 372 |

This modified alkyd ester was prepared in the manner as described in Example V.

The modified alkyd ester base analyzed: Gardner color 1+; vis 18.7 stokes; AN 90.8 (on solids); NV 50.2%.

Part 2: To 2,629 parts of a 50% solution of this modified alkyd ester in xylene was added 218 parts triethylamine, 256 parts epoxidized linseed oil (8.3% oxirane oxygen) and 107 parts butanol, in the manner as described in Example I, and analyzed: NV 49.7%; vis. P (Gardner-Holt); Color 2—.

*Example VIII*

Part 1:

| | Parts |
|---|---|
| (A) Hydrogenated coconut fatty acids | 955 |
| (B) Ethylene glycol | 135 |
| (C) Pentaerythritol | 880 |
| (D) Phthalic anhydride | 2,430 |
| (E) Maleic anhydride | 10 |
| (F) Xylene | 200 |

The above components were mixed and reacted under conventional esterification xylene reflux at 365–390° F. until an acid value of 60–65 was obtained. The solution was then cooled to 275° F. and 940 parts tetrachlorophthalic anhydride was added. The modified partial alkyd ester base was formed by again raising the temperature between 350° and 380° F. for 35 minutes, after which the composition was cooled to 300° F. and thinned to 50% solids with xylene.

The 50% NV modified alkyd ester base analyzed: Gardner color 2; vis. 27.8 stokes; AN 92.5 (on solids).

Part 2: To 400 parts of the xylene solution of the modified alkyd base of Part 1 was added 8.3 parts triethylamine, 16 parts monobutyl ether of ethylene glycol and 60 parts epoxidized linseed oil (8.3% oxirane value). This mixture was heated for 30 minutes at 140° F. to form a partially reacted alkyd ester-epoxy complex, after which reaction was stopped by adding 19.3 parts triethylamine. This amine neutralized the residual acidity and temporarily stopped the reaction. The addition of 15.4 parts xylene thinned the vehicle composition to a more suitable coating viscosity.

The neutralized product at 50% NV analyzed: Gardner color 2; vis. 7.9 stokes.

The following examples are illustrative of the variable components and compositions, as herein described.

*Example IX*

Part 1: A mixture of the following components, in parts by weight, was prepared consisting of:

| | Batch 1 (Parts) |
|---|---|
| (A) Pelargonic acid | 100 |
| (B) Pentaerythritol | 103 |
| (C) Phthalic anhydride | 130 |
| (D) Fumaric acid | 1.2 |
| (E) Xylene | 20 |

Batch 2: Multiply each part of Batch 1 by 10.

This mixture was cooked by a conventional solvent reflux technique at 360–385° F. until the acid number reached about 72–77. The reaction mass was then cooled to 275° F. or lower and 94 parts tetrachlorophthalic anhydride was added. This mixture was heated to 350° F. and held above 350° F. for at least 30 minutes. This obtained a modified alkyd ester with residual acidity. The modified alkyd ester was cooled at 300° F. and thinned with xylene to about 50% non-volatiles. The modified alkyd ester, analyzed: NV 50.8%; Gardner color 3—; vis. 18.9 stokes; AN 94.7 (on solids).

Part 2: To 984 parts of Part 1 material was added 62 parts dimethylformamide (or 85 parts triethylamine), 35 parts butanol, 26 parts xylene and 125 parts epoxidized linseed oil (8.3% oxirane value) with stirring until the solution was homogeneous. This solution analyzed: NV 49.8%; vis. 4.35 stokes; Gardner color 2+.

*Example X*

Part 1: An alkyd ester material prepared in the manner as described in Example X, was formed consisting of:

| | Parts |
|---|---|
| (A) Pelargonic acid | 800 |
| (B) Technical benzoic acid | 168 |
| (C) Pentaerythritol | 1,030 |
| (D) Phthalic anhydride | 1,280 |
| (E) Maleic anhydride | 10 |
| (F) Xylene | 200 |

This alkyd ester preparation was then modified by the addition of 1,180 parts chlorendic anhydride and the initial ester modified in the manner as described. This modified alkyd ester analyzed: NV 50.2%; vis. 56.3 stokes; Gardner color 2; AN 92.6 (on solids).

Part 2: To 996 parts of a product of Part 1, was added 86 parts diethanolamine (or 83 parts triethylamine), 46 parts butanol, 25 parts xylene, and 125 parts epoxidized linseed oil and the mixture was blended until homogeneous. The composition analyzed: NV 49.0%; vis. 2.0 stokes; Gardner color 2—.

*Example XI*

Part 1: The modified alkyd ester was prepared in the manner as indicated in Example IX and consisted of:

| | Batch 1 (Parts) |
|---|---|
| (A) Pelargonic acid | 95 |
| (B) Ethylene glycol | 10 |
| (C) Pentaerythritol | 100 |
| (D) Tetrahydrophthalic anhydride | 147 |
| (E) Maleic anhydride | 1 |
| (F) Xylene | 20 |

Batch 2: Multiply each part of Batch 1 by 10.

This alkyd ester was modified with 94 parts tetrachlorophthalic anhydride, in the manner as illustrated in Example IX. The modified alkyd ester analyzed: NV 51.6; vis. 9.8 stokes; Gardner color 2; AN 82.0 (on solids).

Part 2: To 968 parts of the modified alkyd ester of Part 1, was added triethylamine 74 parts, butanol 30 parts, xylene 28 parts, and epoxidized linseed oil (8.3% oxirane value) 100 parts, with blending until the mixture formed a homogeneous composition. This compositon analyzed: NV 50.0%; vis. 2.0 stokes; Gardner color 2—.

*Example XII*

Part 1: This modified alkyd ester was prepared in the manner illustrated for Example IX and comprised the components set forth in Example XI, in the proportionate parts as indicated, with the exception of replacing the tetrahydrophthalic anhydride with 149 parts hexahydrophthalic anhydride. The initial modified alkyd ester analyzed: NV 51.1%; vis. 2.4 stokes; Gardner color 2; AN 89.7 (on solids).

Part 2: To 978 parts of the modified alkyd ester solution of Part 1 was added 81 parts triethylamine, 10 parts butanol, 31 parts xylene, and 100 parts epoxidized linseed oil (8.3% oxirane value). This mixture was blended until homogeneous and analyzed: NV 50.0%; vis. 1.3 stokes; Gardner color 2—.

*Example XIII*

Part 1: This alkyd ester was prepared by mixing hydrogenated coconut fatty acids 231.4 parts, resinous polyol 43.7 parts, pentaerythritol 223.3 parts, phthalic anhydride 328.6 parts, maleic anhydride 2.3 parts, and xylene 20 parts, cooked in the manner as described in Example IX except that the initial alkyd esterification was stopped when the acid number reached 76–82 for addition of 217.5 parts tetrachlorophthalic anhydride, as the acid base modifier for the initial alkyd esterification material. The modified alkyd ester analyzed: NV 51.5%; vis. 128 stokes; Gardner color 2+; AN 97.8 (on solids).

Part 2: To 771 parts of the modified alkyd ester solution of Part 1 was added 70 parts triethylamine, 48 parts butanol, 13 parts xylene, and 99 parts epoxidized linseed oil (8.3% oxirane oxygen). These materials were blended until a homogeneous solution was obtained. The solution analyzed: NV 49.5%; vis. 6 stokes; Gardner color 2.

Components of Part 1: In the preparation of the modified alkyd resin half ester composition, the fatty acids indicated are illustrative of saturated and unsaturated fatty acids derived from fatty oils of vegetable, animal and marine origin, containing from 6 to 26 and preferably 8 to 20 carbon atoms in the fatty chain. In lieu of fatty acids, glyceride oils may be used to prepare the alkyd ester by alcoholysis preferably in the presence of a catalyst, with a polyfunctional alcohol before the addition of the dibasic acid, usually phthalic anhydride. The typical examples of non-limiting saturated or unsaturated fats and oils are cottonseed, corn, rapeseed, soybean, safflower, castor, dehydrated castor, linseed, menhaden, sardine, whale, cod, tallow, lard and the like. Further, synthetically produced monobasic acids of the character of 2-ethyl hexoic acid, a benzoic acid, p-tertiary butyl benzoic acid, pelargonic acid and "oxo" derived acids may be utilized. Some typical fatty acids contained in and derived from the fatty oils utilized, as single components but generally as mixtures, in making the alkyd ester base are preferably caproic, caprylic, capric, lauric, myristic, palmitic, stearic, behenic, oleic, erucic, linoleic, linolenic, arachidonic and clupanodonic. In addition the fatty acids may be used with and modified by a benzoic acid material and the like.

The amount of fatty oil, or fatty and mono-basic acid components used in the alkyd can be varied. Generally, the alkyd resin is modified to contain between 10% and 40%, with preferably 20% to 30% oil or comparable monobasic acid material.

The polyol components, for example, may be a pentaerythritol, trimethylolethane, trimethylolpropane, sorbitol, diethylene glycol, proplyene glycol, ethylene glycol, glycerol, 1,2,6 hexanetriol-1,2,6 copolymers of styrene and allyl alcohol and glycol etherified phenols and the like. The quantity of these polyols used is preferably in an amount chemically equivalent to the total acidity of the composition but this can vary from a deficiency of about 10% to an excess of about 10%. Even though excess acidity remains in the finished alkyd ester or resinous material at least the theoretical amount of polyol is preferred for film forming compositions.

The first dibasic acid component of the alkyd ester portion can be anyone of those known to the art. However, while either phthalic anydride, tetrahydrophthalic anhydride or hexahydrophthalic anhydride is preferred, other dibasic acids as isophthalic acid, teraphthalic acid, tetrachlorophthalic anhydride, maleic anhydride, adipic acid, fumaric acid, chlorendic anhydride, succinic anhydride, and the like may be used. In the preceding examples, the preferred dibasic acid materials are illustrative. Further, the initial dibasic component may be added in excess with retention of acid value. In the preferred method the second dibasic component must be in anhydride form and is preferably the tetrachlorophthalic, monochlorophthalic, chlorendic, phthalic, tetrahydrophthalic, hexahydrophthalic anhydrides, and the like. The addition of the maleic acid material as an auxiliary component may be eliminated, but is preferred as it aids in solution color, especially with unsaturated fatty acids utilized in preparation of the modified alkyd.

The above dibasic acid compounds used in Part 1 of the examples, as indicated, may also be used in anhydride form to further modify the alkyd ester body after the first major portion of the alkyd esterification reaction has been completed. These anhydrides are believed to afford the reaction and coupling linkage between the modified alkyd partial ester material and the epoxidized oil base component. The tetrachlorophthalic anhydride is preferred for optimum film hardness and flexibility. The other dibasic materials may be substituted to form comparable and softer films and plastics, dependent upon the particular fatty chain and oxirane content, as described. That is, the free carboxyl groups furnished in the alkyd base are essentially reactive with the oxirane oxygen of the epoxidized oil base component of Part 2. Accordingly, the alkyd resin is modified by the oxirane content in a functional relationship. For optimum film and body hardness, the oxirane equivalent of the epoxy component is preferably in excess of the free carboxyl groups in the alkyd resin half ester base.

For chemical equivalence based upon the acidity of the alkyd resin, the amount of epoxidized linseed oil (8.0% to 9.5% oxirane) is between about 15% to 20% and for soybean oil (5.0% to 6.7% oxirane) the amount added is between about 20% to 25% based on the total weight of the alkyd ester and epoxy component for optimum film properties. With an excess of oil material, hardness is maintained with higher oxirane values.

As indicated in the foregoing examples, xylene is the preferred solvent used in forming the partial or modified alkyd ester. Other aromatic solvents of the character of toluene and the like may be utilized. In addition, another solvent of the character of butanol, mono- and dibutyl ethers of ethylene and diethylene glycols, mono- and di-ethyl ether of ethylene and diethylene glycol and the like in the proportion of about 1% to about 5%, is often desirable. The additional solvent increases solution clarity and provides viscosity control.

Components of Part 2: The volatile neutralizer stabilizer or inhibitor is for stopping and retarding the reaction between the alkyd half ester and the epoxy component. The volatile component passes off during baking to allow the residual acidity of the alkyd half ester to react with the epoxy component. As indicated, the tertiary amines are preferred. However, other like volatile amines and volatile alkyl amides as dimethyl formamide and other temporary reaction inhibitors of the character of weak organic bases may be utilized in the corresponding and necessary amounts, as required, and with or without being in mixed form for obtaining neutralization. However, in some instances other less preferable inhibitors, for example, ammonia, dimethylethanol amine, mono-ethanolamine, diethanolamine, dipropylamine, diisopropylamine and mixtures thereof may be utilized, in correspondingly equivalent stoichiometric and necessary amounts, as indicated.

The epoxidized oils and epoxidized compounds useful in this invention are those, for example, of the character disclosed and prepared by the methods as set forth in the issued patents of Niederhauser, 2,485,160; Wahlroos, 2,813,878; or as set forth in Ritter Jr., et al., 2,771,472; and Swern, 2,569,502. Essentially, these oils are those containing unsaturation as mentioned in the base oils for the alkyd resins, or alkyd esters, of Part 1 of the examples. These unsaturated oils, or their fatty acids, may be preliminarily converted to other esters by alcoholysis or esterification with aliphatic and aromatic, saturated and unsaturated, substituted and unsubstituted, mono- and poly-hydric alcohols prior or subsequent to epoxidation. In addition, the use of epoxidized long chain fatty esters, or epoxidized dimer and trimer polymers thereof, is also possible; e.g. mono- and poly-epoxy compounds as epoxystearyl acetate, epoxy-stearyl epoxy-stearate, butyl epoxy-stearate, octyl epoxy-behenate, methyl di- epoxy-stearate, di-(epoxy-lauryl) adipate, propyl tri- epoxy-stearate, allyl epoxy-stearate, and the like which contain between about 4% to about 12% oxirane oxygen.

More particularly, oxirane compounds which may be utilized are the epoxidized glyceride oils containing between 5% and 12% oxirane oxygen. Preferably, in this group, selective oil base material containing between 8% and 9.5% oxirane has been found particularly applicable for its film forming properties. Hence, the base oil, for epoxidation should preferably have an iodine value of at least 150. Typical of this class are linseed, segregated soybean, safflower, and fish oils. However, epoxidized linseed oil, as indicated is preferred for pigmented paint and enamel compositions.

Although the epoxy-oils and esters mentioned above, are of animal, vegetable and marine origin, use of epoxidized compounds of synthetic and petroleum sources are not excluded.

Broadly defined, the oxirane compounds useful in this invention are essentially substituted and unsubstituted long chain fat derived compounds containing between 6 and 26 carbon atoms in the fatty chain portion having at least one internal oxirane oxygen and preferably a plurality of internal oxirane groups per chain.

The end uses and properties of the final products of this invention are determined by several factors, among which are:

(1) Degree of mono-basic acid modification (oil length or modification) of the modified alkyd ester of Part 1 in the examples;

(2) The weight ratio of the alkyd resin to the epoxidized oil base component of Part 2 of the examples;

(3) The oxirane content and structure of the epoxidized oil base component in Part 2 of the examples.

Film hardness and the overall quality of baked films of the final products increases as the oxirane content of the epoxy oil base component increases when the amount and type of alkyd ester is held constant. Conversely, hard to soft to plastic to tacky films are possible when the preferred oxirane value of 8 to 8.5% diminishes to about 4%. If the oxirane content of the epoxy oil is held constant and the percent oil or mono-basic acid modification of the alkyd ester increases, films become softer. Thus, for a given set of desired end properties the weight ratio of the acidic alkyd ester base to epoxidized oil base components, i.e. alkyd modification and oxirane content of the epoxy component are all important and inter-related.

As a generalization, films of essentially equivalent properties can be made by combining: first, two portions of a short alkyd resin of 20% to 25% mono-basic acid modification with one portion of an epoxidized linseed oil (8 to 9.5% or more oxirane); second, six portions of a longer alkyd resin of 25% to 40% mono-basic acid modification with one portion of an epoxidized linseed oil (8 to 9.5% or more oxirane). The above proportions are within the preferred limits to obtain the desired film properties of the products herein described. Other ratios outside of these disclosed and certain factors of change within the ratios, as indicated, will serve to form a wider range of products varying from tacky and adhesive compositions, to tough to hard friable and brittle products.

While the composite mixtures, as herein described, may be utilized in the plastic and analogous arts, it is preferred that they be pigmented and used as a baked finish. When so used, they provide a very tough film, tenaciously adherent to metal, glass, wood and resinous surfaces. The films have very high gloss with good color retention, excellent water, acid and alkali resistance, are not brittle and have a high degree of flexibility.

The soluble alkyd ester-epoxy esters are compatible with other soluble resinous materials such as resins of the phenol formaldehyde, butylated melamine, and acrylic emulsion types. Further, the alkyd ester-epoxy mixtures are dispersible in water, by use of an excess of amine neutralized, and can be mixed with other water soluble and dispersible materials. Consequently, the film forming characteristics and plastic properties thereof can be further varied from hard to soft and from high gloss to matte. Generally, less gloss and softness obtain when the components are not entirely mutually compatible.

The following example illustrates further compositions which may be formulated from the alkyd ester-epoxy mixtures, as herein disclosed, with other compatible materials of a resinous character:

*Example XIV*

Parts by weight
(A) Solvent soluble alkyd ester-epoxy mixture, as herein disclosed from Example I (e.g.) _____ 100
(B) Solvent soluble material, for example, phenol-formaldehyde (Arophene 700) _____ 2–30

The alkyd ester-epoxy mixture, A, and second soluble resin, B, are simply mixed at a desired concentration level, with or without the addition of a mutual solvent. The compositions form plastics or may be pigmented and used, preferably as spray or dip coating materials, as herein described.

The addition of the resinous material is as a modifier which will change the film and plastic forming properties of the alkyd epoxy resin complexes. For example, a mixture of any one of the melamine resins listed above and added in increasing ranges will increase the baked film hardness. Surprisingly, by comparison with standard resin systems at equal melamine levels harder and more flexible films are obtained. The addition of from about 2% or more of the melamine resin material also increases color and gloss retention, and chemical resistance of the alkyd ester-epoxy complexes. Further, the modified alkyd esters in combination with epoxy compounds of lower i.e. about 4–6% oxirane value, as herein defined, form adhesive to soft plastic films which may be further modified by the addition of latex solutions and emulsions of synthetic rubbery latices as butadiene-styrene and the like, which combinations cure from adhesive to tough flexible rubbery plastic masses and films.

Normally a slight excess of the neutralizer material is added to the compositions. In some instances it may be desirable to produce emulsions of the compositions by the addition of emulsifier material, for example, about 2% excess tertiary amine neutralizer, as triethylamine and water. However, the viscosity reduces very slowly with the addition of water and these emulsion compositions are not generally suitable as water thinned coating vehicles. However, for use in plastics and as addition agents they may be compounded with other water soluble materials, as proteins, urea formaldehyde and other water and solvent soluble resinous systems which are compatible with the modified alkyd ester-epoxy compositions. These modified alkyd ester-epoxy compositions are primarily useful in providing plastic, adhesive and bonding compositions in the laminating and related arts.

The preferred solvent compositions, as illustrated by the examples, are useful as vehicles in the paint and enamel industry. The vehicles can be pigmented in a manner similar to other solvent type vehicles in any conventional roller, ball or pebble mill. The pigmented compositions are very stable upon storage. The vehicles are preferably used for producing baking finishes. The films formed thereby, at a Sward hardness level of about 30%, will pass about a 60% G. E. Impact Test and at a 40% Sward hardness will pass about a 40% G. E. Impact Test. By comparison presently known standard films of 30% to 40% Sward hardness pass only about a 12–20% G. E. Impact Test.

A pigmented enamel formulation, prepared as a coating composition of the preferred character, is illustrative of the film forming compositions herein described, as follows:

*Example XV*

| | Parts by weight |
|---|---|
| (A) Alkyd ester-epoxy solution from Example I (e.g.) | 107 |
| (B) Titanium dioxide (RA) | 195 |
| (C) Xylene | 50 |
| (D) Mono-butyl ether of ethylene glycol | 5 |

The above components are added to a conventional pebble mill and ground for a period of from 16 to 48 hours, in a conventional manner. Thereafter, 290 more parts of the alkyd ester-epoxy mix of Example I and 76 parts xylene are added with continued mixing until a smooth mixture is obtained. The pigmented composition contained approximately:

| | |
|---|---|
| Resin solids | 26.9%. |
| Pigment solids | 26.9%. |
| Pigment volume conc. | 19%. |
| Pigment-binder ratio | 1. |
| No. 4 Ford cup viscosity | 44.8 seconds. |

This composition was sprayed and baked at 250° F. for 30 minutes, to form a water and chemical resistant, hard, tough, high gloss enamel film. Additional films were found to bake at temperatures from 150°–350° F. in a period of time extending from 10 minutes to about 1 hr. A faster bake is obtained at the higher temperature of bake. Other and conventional pigments, in lieu of titanium dioxide can be similarly compounded with the vehicles of this disclosure for the production of paint and primer compositions.

Having described the present embodiment of our improvement in the art in accordance with the patent statutes, it will be apparent that some modifications and variations as hereinto set forth may be made without departing from the spirit and scope thereof. The specific embodiments described are given by way of examples illustrative of the improvement which is to be limited only by the terms of the appended claims.

We claim:

1. In combination, in an organic solvent, (1) an alkyd resin containing modifying acid chains of 6 to 26 carbon atoms (2) an epoxidized fatty ester and (3) an alkyl amine neutralizing agent, said alkyd resin (1) comprising the reaction product of (a) polyhydroxy alcohol, (b) monocarboxylic acids containing 6 to 26 carbon atoms and (c) polycarboxylic acid materials selected from the group consisting of polycarboxylic acids, polycarboxylic anhydrides and mixtures of the same, said reaction product prepared as a polyester containing a plurality of retained reactive hydroxyl and carboxyl groups and having an acid number of about 80 to 120, said epoxidized fatty ester (2) having carbon chain portions of 6 to 26 carbon atoms containing oxirane groups, each oxirane group forming a three member heterogeneous ring with two adjacent carbon atoms within the said carbon chain portion, said alkyl amine (3) containing 1 to 6 carbons in an alkyl group and being present in an amount to neutralize the residual acidity of the said prepared alkyd resin and to temporarily inhibit the reaction between the said acidity and the oxirane of the said epoxidized fatty ester (2).

2. The product of claim 1 wherein, the monocarboxylic acid (b) is derived from a fatty oil material selected from the group consisting of animal, vegetable and marine oils with 8 to 26 carbon atoms in the fatty chain.

3. In combination, (1) about 65% to about 95% of long chain fatty acid modified alkyd resin having residual hydroxyl and carboxyl groups and an acid number of about 80 to 120, (2) about 5% to about 35% epoxidized fatty ester having a carbon chain portion with 6 to 26 carbon atoms containing internal oxirane groups forming a three member heterogeneous ring with two adjacent carbon atoms within the said carbon chain in an unreacted state, (3) about 2.5% to about 7% volatile alkyl amine neutralizing agent temporarily inhibiting reaction between the said alkyd resin (1) and said oxirane of said epoxidized fatty ester (2) by neutralizing the carboxyl groups present in said alkyd, and (4) an organic solvent for the combination of said (1) alkyd, (2) epoxidized ester and (3) neutralizing agent.

4. The product of claim 3 wherein, said neutralizing agent is a volatile tertiary amine.

5. The product of claim 3 including an inert pigment and additional different organic solvent, and the solution is compounded as a baking enamel.

6. The product of claim 3 including a compatible and different non-alkyd film forming resin in the proportion of about 2–30 parts by weight.

7. The product of claim 3 wherein, the alkyd resin contains about 10% to about 40% long chain fatty oil.

8. The product of claim 3 wherein, the alkyd resin contains about 10% to about 40% monocarboxylic acid chains having 6–26 carbon atoms in the acid group.

9. In combination, an organic solvent solution comprising (1) an alkyd resin modified with monobasic acid carbon chains of 6 to 26 carbon atoms and (2) from about 5% to about 25% epoxidized fatty ester containing unreacted oxirane groups, said alkyd resin (1) having a plurality of hydroxyl and neutralized carboxyl groups with a neutralized residual acid number of about 80 to 120, said epoxidized fatty ester (2) having between about 4% to 12% oxygen as non-terminal oxirane groups formed by introducing oxygen into a carbon chain containing 6 to 26 carbon atoms and providing a three member heterogeneous ring with two adjacent carbon atoms within the carbon chain, and (3) a volatile acid neutralizing means for temporarily neutralizing said residual acidity and for temporarily inhibiting reaction between the carboxyl groups of said alkyd (1) and the oxirane groups of said epoxidized fatty ester (2).

10. The product of claim 9 wherein, said epoxidized fatty ester is an epoxidized glyceride oil.

11. The product of claim 10 wherein, said epoxidized glyceride oil is epoxidized linseed oil.

12. The product of claim 10 wherein, said epoxidized glyceride oil is epoxidized soybean oil.

13. The product of claim 10 wherein, said epoxidized glyceride oil is epoxidized safflower oil.

14. The product of claim 9 wherein, the said alkyd is modified with a fatty oil containing a fatty acid chain of 6 to 26 carbon atoms and the epoxidized material is essentially an epoxidized fatty oil.

15. The product of claim 14 wherein, the alkyd is modified with a polycarboxylic acid anhydride and the solution contains about 2 to about 30 parts of a different film forming resin modifier.

16. The method of preparing an organic solvent solution of alkyd resin modified with fatty chains of 6 to 26 carbon atoms and an epoxidized fatty ester containing oxirane groups formed by introducing oxygen into a carbon chain portion of 6 to 26 carbon atoms and providing a three member heterogeneous ring with two adjacent carbon atoms within the said carbon chain, the steps comprising (1) mixing a combination of modified alkyd forming components comprising (a) a monocarboxylic acid material of 6 to 26 carbon atoms in the fatty chains, (b) a polycarboxylic acid material selected from the group consisting of polycarboxylic acid, polycarboxylic anhydrides and mixtures of the same and (c) a polyhydric alcohol, (2) heating and effecting an esterification reaction between said (a), (b) and (c) at a temperature of about 360° F. to about 400° F. until an acid number of about 45 to about 90 is reached, (3) adding additional polycarboxylic acid anhydride in an amount of about 10% to about 30% by weight of the esterification reaction product, (4) mixing and reheating the mixture to about 360°–380° F. for a period until an alkyd resin is formed with residual carboxyl groups, and having an acid number of about 80 to 120, (5) thinning the said alkyd with an organic solvent, (6) adding a volatile neutralizing agent to neutralize the acidity of said alkyd resin and (7) adding and mixing therewith an epoxidized fatty ester in an amount such that the oxirane equivalent of the epoxidized ester is in excess of the neutralized carboxyl groups of the said alkyd.

17. The process of claim 16 wherein, a portion of the said neutralizing agent is mixed with the said epoxidized fatty ester before addition to the said alkyd resin.

18. The process of claim 16 wherein, the modifying agent for said alkyd resin is between about 10% to 40% fatty oil and the said epoxidized ester is an epoxidized fatty glyceride containing 6 to 26 carbon atoms in the fatty group and present in an unreacted amount of about 5% up to about 25% of the mixtures.

19. The process of claim 16 including the step of adding and partially reacting the added epoxidized ester with the said alkyd before adding all of said neutralizing agent, subsequently neutralizing the remaining acid value of said alkyd and stopping the reaction between the said alkyd and said epoxidized esters with retention of from 5% to about 25% of the epoxidized esters in an unreacted state.

20. In the method of preparing a paint and enamel vehicle comprising an organic solvent soluble mixture of (A) an alkyd resin containing modifying acid chains of 6 to 26 carbon atoms and (B) an epoxidized fatty ester, the steps comprising (1) preparing said alkyd resin, (2) adding a polycarboxylic acid anhydride to said alkyd, heating and effecting the formation of a partially formed polyester with said alkyd and said anhydride, said polyester having a plurality of hydroxyl and carboxyl groups with a retained acid value of about 80 to 120, (4) adding an epoxidized fatty ester of about 4% to 12% oxirane value in the proportions of from about 2 to 6 parts of said polyester to about one portion of epoxidized fatty acid ester and (5) including a volatile neutralizing agent for said carboxyl groups selected from the group consisting of volatile amines, volatile amides and ammonia for temporarily inhibiting reaction between said polyester and said epoxidized ester, (6) adding an organic solvent, and (7), blending the mixture.

21. The method of claim 20 wherein, the alkyd resin is modified with fatty oil and the epoxidized ester is an epoxidized fatty glyceride oil added in an amount of about 15% to about 30% based on the total weight of the said oil modified alkyd.

References Cited by the Examiner

UNITED STATES PATENTS

| | | | |
|---|---|---|---|
| 2,556,145 | 6/51 | Niederhauser | 260—18 |
| 2,720,500 | 10/55 | Cody | 260—22 |
| 2,852,477 | 9/58 | Greenlee | 260—22 |
| 2,907,726 | 10/59 | Greenlee | 260—22 |
| 2,959,559 | 11/60 | Delius | 260—22 |

LEON J. BERCOVITZ, *Primary Examiner.*